US008607030B2

(12) United States Patent
Adachi et al.

(10) Patent No.: US 8,607,030 B2
(45) Date of Patent: Dec. 10, 2013

(54) SCHEDULING THREADS INSTRUCTIONS IN VARIABLY SELECTED OR PREDETERMINED ORDER PERIODS OF REQUESTED TIME RATIO

(75) Inventors: Koji Adachi, Kanagawa (JP); Kazunori Miyamoto, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 544 days.

(21) Appl. No.: 12/585,877

(22) Filed: Sep. 28, 2009

(65) Prior Publication Data

US 2010/0082945 A1 Apr. 1, 2010

(30) Foreign Application Priority Data

Sep. 30, 2008 (JP) ................................. 2008-252232

(51) Int. Cl.
*G06F 9/38* (2006.01)
(52) U.S. Cl.
USPC .......................................... 712/214; 718/107
(58) Field of Classification Search
None
See application file for complete search history.

(56) References Cited

U.S. PATENT DOCUMENTS

| 7,401,208 | B2 * | 7/2008 | Kalla et al. | 712/224 |
|---|---|---|---|---|
| 7,490,230 | B2 * | 2/2009 | Jensen et al. | 712/245 |
| 7,925,869 | B2 * | 4/2011 | Kelsey et al. | 712/220 |
| 7,958,333 | B2 * | 6/2011 | May | 712/205 |
| 8,117,618 | B2 * | 2/2012 | Holloway et al. | 718/103 |
| 8,291,195 | B2 * | 10/2012 | Ukai | 712/205 |
| 2006/0123420 | A1 | 6/2006 | Nishikawa | |
| 2009/0210660 | A1 * | 8/2009 | Webber | 712/205 |

FOREIGN PATENT DOCUMENTS

| JP | 2006-155480 A | 6/2006 |
|---|---|---|
| JP | 2007-058331 A | 3/2007 |
| JP | 2007-317171 A | 12/2007 |
| JP | 2008-52750 A | 3/2008 |

OTHER PUBLICATIONS

Japanese Office Action dated Jul. 10, 2012 (English Translation Thereof).
Umesh Gajanan Nawathe, et al. "Implementation of an 8-Core 64-Thread, Power-Efficient SPARC Server on a Chip", IEEE Journal of Solid-State Circuits, vol. 43, No. 1, Jan. 2008.
Harlan McGhan, "Microprocessor: The Insider's Guide to Microprocessor Hardware; Niagara 2 Open the Floodgates, Niagara 2 Design is Closest Thing Yet to a True Server on a Chip", www.MRPonline.com; Nov. 6, 2006.
Ana Sonia Leon, et al. "A Power-Efficient High Throughput 32-Thread SPARC Processor", IEEE Journal of Solid-State Circuits, vol. 42, No. 1, Jan. 2007.

(Continued)

*Primary Examiner* — Kenneth Kim
(74) *Attorney, Agent, or Firm* — McGinn Intellectual Property Law Group, PLLC

(57) ABSTRACT

A multi-thread processor in accordance with an exemplary aspect of the present invention includes a plurality of hardware threads each of which generates an independent instruction flow, a thread scheduler that outputs a thread selection signal TSEL designating a hardware thread to be executed in a next execution cycle, a first selector that outputs an instruction generated by a hardware thread selected according to the thread selection signal, and an execution pipeline that executes an instruction output from the first selector, wherein the thread scheduler specifies execution of at least one hardware thread selected in a fixed manner in a predetermined first execution period, and specifies execution of an arbitrary hardware thread in a second execution period.

37 Claims, 5 Drawing Sheets

(56) References Cited

OTHER PUBLICATIONS

Robert Golla, "Nigara2: A Highly Threaded Server-on-a-Chip", Sun Microsystems. Oct. 10, 2006.

Jinghe Zhang, "Chip Multi-threading and Sun's Niagara-series", Department of Computer Science, College of William and Mary., Advance Computer Architecture, Jan. 2009.

"SPARC Pipe-Basic Dataflow", Sun Microsystem, Fall Microprocessor Forum, Oct. 2006.

\* cited by examiner

CONFIGURATION OF SLOT

| TIME | COUNT VALUE CNT | SLOT TO BE SELECTED | VALUE OF THREAD CONTROL REGISTER | | VALUE OF THREAD SELECTION SIGNAL TSEL |
|---|---|---|---|---|---|
| | | | HW TREAD NUMBER | REAL-TIME BIT | |
| t1 | 0 | 0 | 0 | 1 | 0 |
| t2 | 1 | 1 | 1 | 1 | 1 |
| t3 | 2 | 2 | 0 | 0 | n |
| t4 | 3 | 3 | 2 | 1 | 2 |
| t5 | 4 | 4 | 1 | 1 | 1 |
| t6 | 0 | 0 | 0 | 1 | 0 |
| t7 | 1 | 1 | 1 | 1 | 1 |
| t8 | 2 | 2 | 0 | 0 | n |
| t9 | 3 | 3 | 2 | 1 | 2 |
| t10 | 4 | 4 | 1 | 1 | 1 | n = ARBITRARY THREAD NUMBER B SELECTED BY SECOND SCHEDULER

Fig. 5

# SCHEDULING THREADS INSTRUCTIONS IN VARIABLY SELECTED OR PREDETERMINED ORDER PERIODS OF REQUESTED TIME RATIO

BACKGROUND

1. Field of the Invention

The present invention relates to a multi-thread processor and its hardware thread scheduling method, and in particular to a multi-thread processor having a thread scheduler that schedules the execution order of a plurality of hardware threads and its hardware thread scheduling method.

2. Description of Related Art

In recent years, multi-thread processors have been proposed in order to improve the processing power of processors. A multi-thread processor has a plurality of threads each of which generates an independent instruction flow. Further, the multi-thread processor performs arithmetic processing while changing the instruction flow to be processed in the arithmetic circuit that processes instructions in pipeline processing between a plurality of instruction flows that are generated by the respective plurality of threads. At this point, the multi-thread processor can execute an instruction generated by one thread in one execution stage of the pipeline while executing an instruction generated by another thread in another execution stage. That is, in the arithmetic circuit of the multi-thread processor, instructions that are independent of each other are executed in different execution stages from each other. In this way, the multi-thread processor can process each instruction flow smoothly while reducing the time period during which no instruction is processed in an execution stage of the pipeline, and thus improving the processing power of the processor.

Japanese unexamined Patent Application Publication No. 2007-317171 discloses an example of such a multi-thread processor. The multi-thread processor described in Japanese unexamined Patent Application Publication No. 2007-317171 includes a plurality of processor elements and a parallel processor control unit that switches the thread of each processor element. Further, the parallel processor control unit counts the execution time of the thread being executed in the processor element, and when the counted time has reached the allocated time for the thread, outputs a time-out signal and switches the thread to be executed by the processor element based on the time-out signal and execution order information retained in an execution order register.

As described above, the instruction flow to be processed in the arithmetic circuit is switched between instruction flows generated by the respective threads in accordance with a schedule in the multi-thread processor. Japanese unexamined Patent Application Publication No. 2008-52750 discloses an example of such a thread scheduling method. In the multi-thread processor described in Japanese unexamined Patent Application Publication No. 2008-52750, a plurality of threads are executed in a circular manner, and each thread is executed for its allocated time in each round. That is, in Japanese unexamined Patent Application Publication No. 2008-52750, a schedule that is established in a fixed manner is executed in a circular manner, so that each thread is executed with a predefined execution time ratio.

Further, Japanese unexamined Patent Application Publication No. 2006-155480 discloses another thread scheduling method. Specifically, Japanese unexamined Patent Application Publication No. 2006-155480 discloses a round-robin method and a priority method as a thread scheduling method. In the round-robin method, threads that are put in a queue are selected and executed one by one at regular intervals. Therefore, in the round-robin method, threads in the queue are impartially assigned to and executed in the CPU at regular intervals. Further, in the priority method, threads are executed in order of their priorities. More specifically, in the priority method, a queue is established for each priority and each thread is put in one of the queues according to its priority. Then, threads are selected, and assigned to and executed in the CPU in descending order of the priority.

SUMMARY

The present inventors have found a problem that in both of the round-robin method and priority method, it is impossible to flexibly establish the execution time of threads while ensuring the minimum execution time of the threads. For example, in the round-robin method, when the number of threads is increased, the execution time is reduced uniformly for each thread, and thus causing a problem that sufficient execution time cannot be allocated to threads having higher priorities. Meanwhile, the priority method has a problem that when processing for threads having higher priorities continues, thread having lower priorities cannot be processed.

A first exemplary aspect of the present invention is a multi-thread processor including: a plurality of hardware threads each of which generates an independent instruction flow; a thread scheduler that outputs a thread selection signal in accordance with a schedule, the thread selection signal designating a hardware thread to be executed in a next execution cycle among the plurality of hardware threads; a first selector that selects one of the plurality of hardware threads according to the thread selection signal and outputs an instruction generated by the selected hardware thread; and an execution pipeline that executes an instruction output from the first selector, wherein the thread scheduler specifies execution of at least one hardware thread selected in a fixed manner among the plurality of hardware threads in a predetermined first execution period, and specifies execution of an arbitrary hardware thread in a second execution period other than the first execution period.

Another exemplary aspect of the present invention is a hardware thread scheduling method in a multi-thread processor, the multi-thread processor including a plurality of hardware threads and being configured to execute an instruction flow generated by the hardware thread while switching the hardware thread in accordance with a predefined schedule, the hardware thread scheduling method including: executing a thread execution schedule in a circular manner, the thread execution schedule including a first execution period during which the hardware thread to be executed is determined in advance and a second execution period during which the hardware thread to be executed is arbitrarily determined; and executing an instruction flow generated by the hardware thread designated in accordance with the thread execution schedule in succession.

In accordance with a multi-thread processor and its hardware scheduling method in accordance with an exemplary aspect of the present invention, hardware threads to be executed in the first execution period are executed regardless of the priorities of the other hardware threads. Meanwhile, arbitrary hardware threads can be executed in the second execution period. In this way, in accordance with a multi-thread processor and its hardware scheduling method in accordance with an exemplary aspect of the present invention, hardware threads for which the minimum execution time should be ensured can be defined in the first execution period, while arbitrary hardware threads can be defined in the second execution period depending on the processing situation at that moment.

In accordance with a multi-thread processor and its hardware scheduling method in accordance with an exemplary aspect of the present invention, the execution time of hardware threads can be flexibly established while ensuring the minimum execution time of the hardware threads.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5 is a table showing operations of a thread scheduler in accordance with a first exemplary embodiment of the present invention.

DETAILED DESCRIPTION OF THE EXEMPLARY EMBODIMENTS

[First Exemplary Embodiment]

Figure 1:
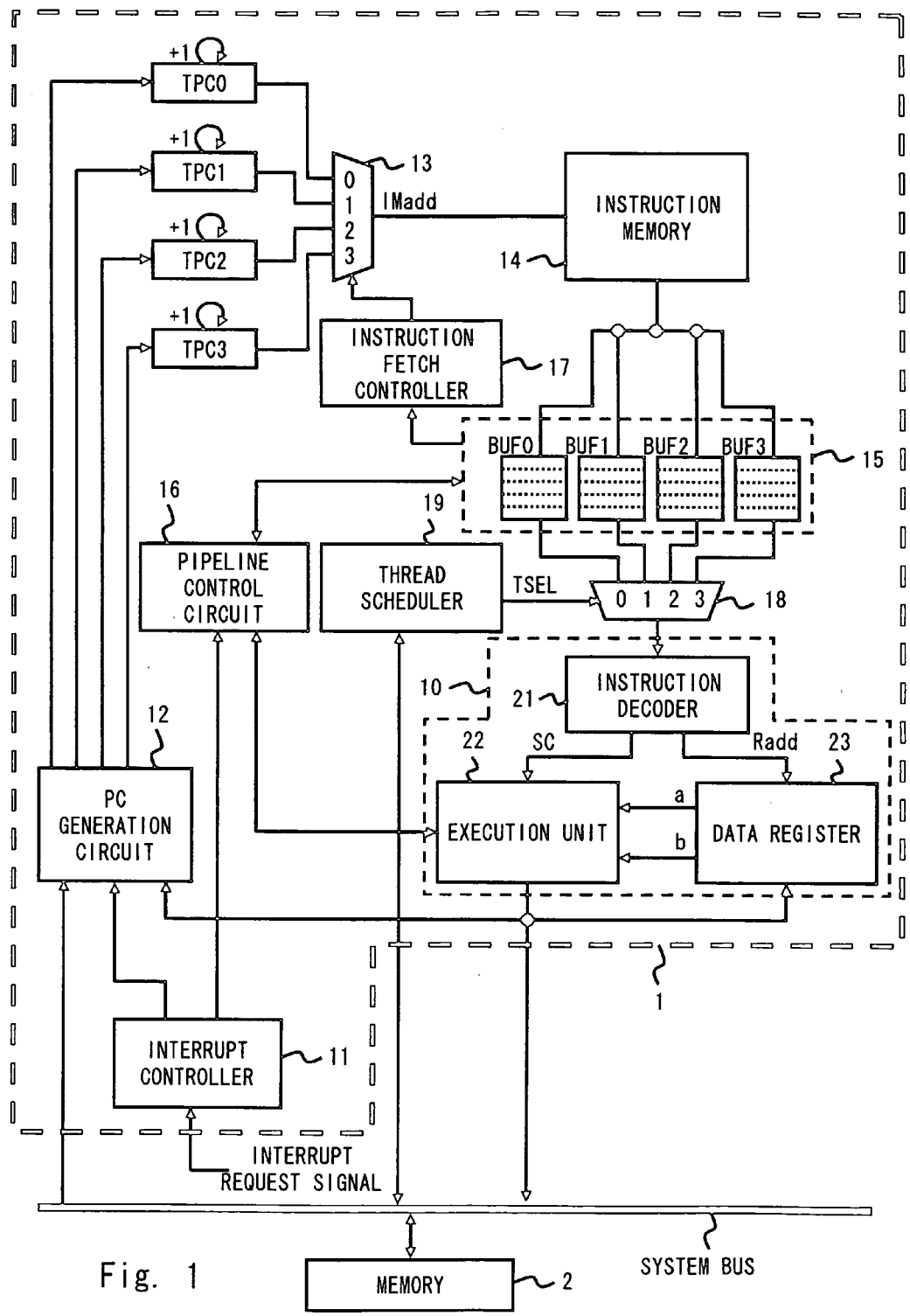
FIG. 1 is a block diagram of a multi-thread processor in accordance with a first exemplary embodiment of the present invention.

Exemplary embodiments of the present invention are explained hereinafter with reference to the drawings. FIG. 1 is a block diagram of a processor system including a multi-thread processor 1 in accordance with a first exemplary embodiment of the present invention. A multi-thread processor 1 is connected to a memory 2 through a system bus in a processor system in accordance with this exemplary embodiment. Note that though they are not shown in the figure, other circuits such as input/output interfaces are also connected to the system bus.

Firstly, a multi-thread processor 1 in accordance with this exemplary embodiment of the present invention is explained hereinafter. The multi-thread processor 1 includes a plurality of hardware threads. The hardware threads are composed of a group of circuits including thread program counters, an instruction memory, a general register, and a control register (it is assumed to be embedded in a pipeline control circuit 16 in this exemplary embodiment) and the like. Further, the hardware thread is a system that generates an instruction flow composed of a series of instructions that are read out from an instruction memory in accordance with instruction fetch addresses output from a thread program counter embedded in the multi-thread processor 1. That is, instructions contained in an instruction flow generated by one hardware thread are highly relevant to each other. In this exemplary embodiment of the present invention, the multi-thread processor 1 is equipped with a plurality of thread program counters. The number of hardware threads is same as the number of the thread program counters. Further details of the multi-thread processor 1 are explained hereinafter.

As shown in FIG. 1, the multi-thread processor 1 includes an execution pipeline 10, an interrupt controller 11, a PC generation circuit 12, thread program counters TPC0 to TPC3, selectors 13 and 18, an instruction memory 14, an instruction buffer 15, a pipeline control circuit 16, an instruction fetch controller 17, and a thread scheduler 19.

The execution pipeline 10 executes data processing based on an instruction generated by a hardware thread selected by the selector 18. More specifically, the execution pipeline 10 includes an instruction decoder 21, an execution unit 22, and a data register 23. The instruction decoder 21 decodes a received instruction and outputs an arithmetic control signal SC to the execution unit 22. Further, the instruction decoder 21 also outputs a data register address Radd indicating the storage location of data based on the decoding result of an instruction. The execution unit 22 performs various arithmetic operations according to the arithmetic control signal SC. Note that the execution unit 22 has a plurality of execution stages and performs arithmetic in pipeline processing. Further, an arithmetic result of execution in the execution unit 22 is transmitted to the PC generation circuit 12, the memory 2, or the data register 23 according to the type of the arithmetic operation result. The data register 23 stores data used in the execution unit 22. Further, the data register 23 outputs data located at an address specified by a data register address Radd. In the example shown in FIG. 1, the data register 23 is configured in such a form that it outputs data a and data b according to the data register address Radd. Further, the data register 23 stores an arithmetic operation result output by the execution unit 22 at an address specified by the data register address Radd.

The interrupt controller 11 receives an interrupt request signal, and outputs an interrupt instruction signal instructing the execution of interrupt processing in the multi-thread processor 1. More specifically, upon receiving an interrupt request signal, the interrupt controller 11 determines the interrupt factor and the priority of the interrupt processing and the like, and instructs the PC generation circuit 12 and the pipeline control circuit 16 to execute interrupt processing so that they carry out processing relevant to that interrupt factor. The interrupt request is also output from other circuits in addition to the one output from the multi-thread processor 1.

The PC generation circuit 12 receives a new program instruction signal input through the system bus, an interrupt instruction signal output from the interrupt controller 11, and a branch instruction signal output based on processing on the execution unit 22, and generates a program count update value. Then, the PC generation circuit 12 provides the program count update value to one of the thread program counters TPC0 to TPC3. Note that the PC generation circuit 12 also has a function of determining which one of the thread program counters TPC0 to TPC3 the generated program count update value is provided to.

The thread program counters TPC0 to TPC3 generate an address in the instruction memory 14 at which an instruction to be processed is stored (hereinafter, this address is referred to as "instruction fetch address IMadd"). Further, when a program count update value is provided from the PC generation circuit 12 to the thread program counters TPC0 to TPC3, the thread program counters TPC0 to TPC3 update the instruction fetch address IMadd according to the program count update value. On the other hand, when no program count update value is input to the thread program counters TPC0 to TPC3, they calculate a next consecutive instruction fetch address by calculating the address in ascending order.

Note that although four thread program counters are shown in FIG. 1, the number of program thread counters may be determined arbitrarily according to the specifications of the multi-thread processor.

The selector 13 selects one of the thread program counters TPC0 to TPC3 according to a thread designation signal output from the instruction fetch controller, and outputs the instruction fetch address IMadd output from the selected thread program counter. Note that numerical signs 0 to 4 affixed to the input terminals of the selector 13 in FIG. 1 indicate hardware thread numbers.

The instruction memory 14 is a memory area used in common by a plurality of hardware threads. Various instructions that are to be used in arithmetic operations performed in the multi-thread processor 1 are stored in the instruction memory 14. Furthermore, the instruction memory 14 outputs an instruction specified by an instruction fetch address IMadd input through the selector 13. At this point, the instruction memory 14 determines which one of the thread program counters TPC0 to TPC3 has output the instruction fetch address IMadd selected by the selector 13, and changes the output destination of the instruction based on the determination result. In this exemplary embodiment of the present invention, the instruction buffer 15 includes instruction buffer areas BUF0 to BUF3 corresponding to the thread program counters TPC0 to TPC3. Therefore, the instruction memory 14 distributes the read instruction to one of the instruction buffer areas BUF0 to BUF3 according to the output source of the instruction fetch address IMadd. Note that the instruction memory 14 may be a predefined memory area contained in the memory 2. Further, the instruction buffer areas BUF0 to BUF3 are a FIFO (First In First Out) type buffer circuit. Furthermore, the instruction buffer areas BUF0 to BUF3 may be configured by dividing an area of one buffer, or may be formed in separated areas.

The pipeline control circuit 16 monitors an instruction stored at the top of the instruction buffer 15 and an instruction being executed in the execution unit 22. Further, when an interrupt instruction signal is input from the interrupt controller 11 to the pipeline control circuit 16, the pipeline control circuit 16 instructs the instruction buffer 15 and the execution unit 22 to discard the instruction that belongs to the hardware thread relating to the interrupt processing.

The instruction fetch controller 17 determines which hardware thread the instruction to be fetched belongs to according to the number of instructions stored in the instruction buffer 15, and outputs a thread designation signal based on the determination result. For example, when the number of instructions in the instruction queue stored in the instruction buffer area BUF0 is smaller than those stored in the other instruction buffer areas, the instruction fetch controller 17 determines that the instruction belonging to 0th hardware thread should be fetched and outputs a thread designation signal indicating the 0th hardware thread. Therefore, the selector 13 selects the thread program counter TPC0. Note that the instruction fetch controller 17 may determine a hardware thread to be selected by using procedure based on a round-robin method.

The selector 18 is a selector that functions as a first selector. The selector 18 selects one of the instruction buffer areas BUF0 to BUF3 according to a thread selection signal TSEL output from the thread scheduler 19, and outputs an instruction read from the selected instruction buffer area to the execution pipeline 10. That is, the selector 18 selects one hardware thread from a plurality of hardware threads according to a thread selection signal TSEL, and outputs an instruction output from the selected hardware thread to the execution pipeline 10. Note that numerical signs 0 to 4 affixed to the input terminals of the selector 18 also indicate hardware thread numbers.

The thread scheduler 19 outputs a thread selection signal TSEL that specifies one hardware thread to be executed in the next execution cycle among a plurality of hardware threads according to a pre-established schedule. That is, the thread scheduler 19 manages in what order a plurality of hardware threads are processed with a schedule, and outputs the thread selection signal TSEL so that instructions generated by hardware threads are executed in the order according to that schedule. Note that in a multi-thread processor 1 in accordance with this exemplary embodiment of the present invention, this schedule is established by a management program that is executed immediately after the multi-thread processor 1 is started up.

The multi-thread processor 1 in accordance with this exemplary embodiment of the present invention has a characteristic feature, particularly, in the hardware thread scheduling method performed in the thread scheduler 19. The thread scheduler 19 itself and its scheduling method are explained hereinafter.

Figure 2:
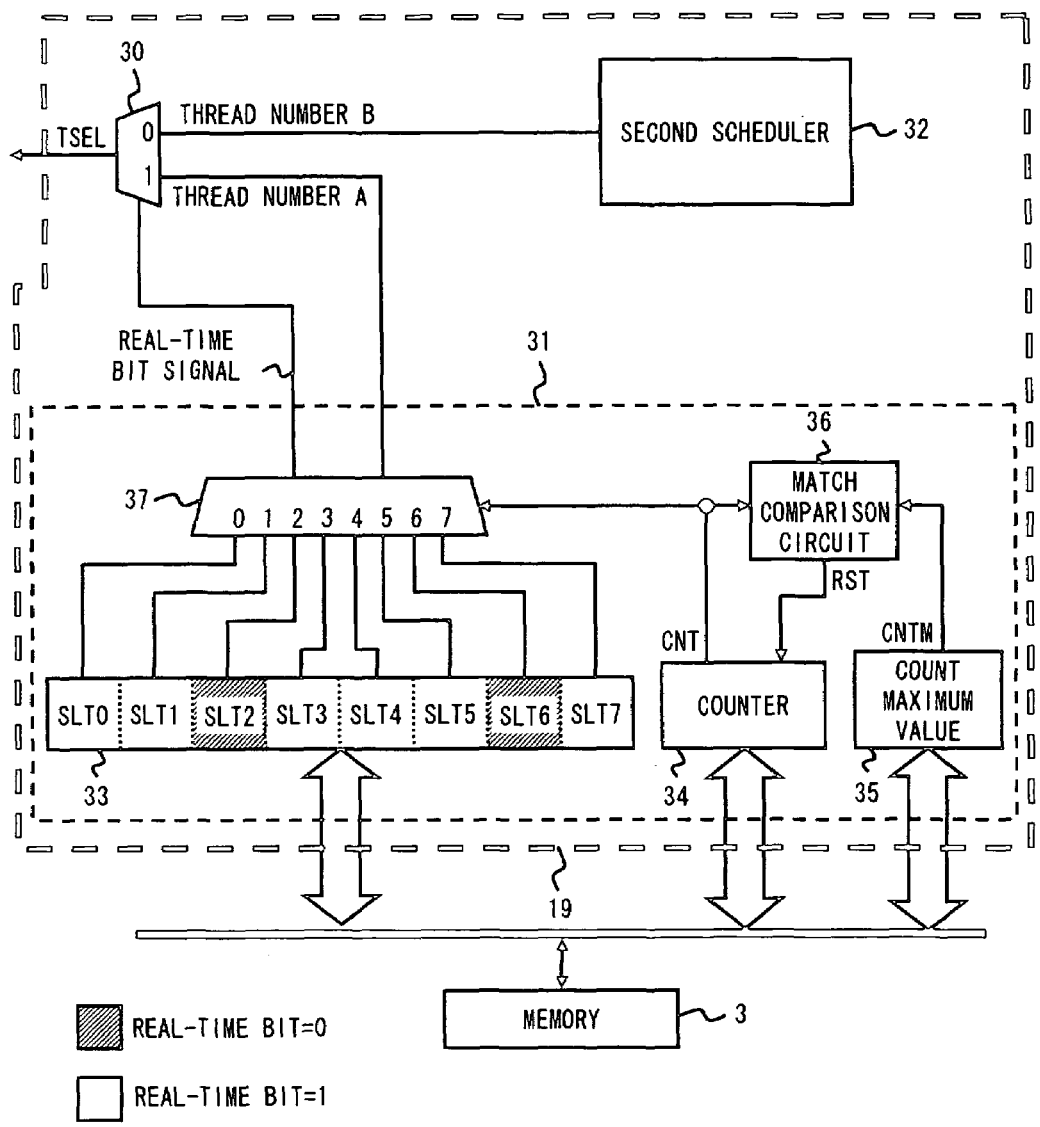
FIG. 2 is a block diagram of a thread scheduler in accordance with a first exemplary embodiment of the present invention.

FIG. 2 shows a block diagram of a thread scheduler 19. As shown in FIG. 2, the thread scheduler 19 includes a second selector (e.g., selector 30), a first scheduler 31, and a second scheduler 32. The selector 30 selects one of a thread number A output from the first scheduler 31 and a thread number B output from the second scheduler 32 according to the signal level of a real-time bit signal, and outputs the selected thread number as a thread selection signal TSEL. The thread number indicated by this thread selection signal TSEL represents the assigned number of the hardware thread that is executed in the next execution cycle.

The first scheduler 31 outputs a selection signal (e.g., real-time bit signal) that is used to select a first execution period or a second execution period, and also outputs a first hardware thread number (e.g., thread number A) designating a hardware thread that is executed in a pre-established execution order during a period in which the real-time bit signal specifies the first execution period. Note that the first execution period means a period during which the real-time bit signal is 1 (which is explained later), and the second execution period means a period during which the real-time bit signal is 0 (which is also explained later). Further, hardware thread numbers to be selected are determined in advance in the first execution period, whereas hardware thread numbers to be selected are arbitrarily determined, for example, by the second scheduler 32 in the second execution period. The first scheduler 31 includes a thread control register 33, a counter 34, a count maximum value storage unit 35, a match comparison circuit 36, and a third selector (e.g., selector 37).

Figure 3:
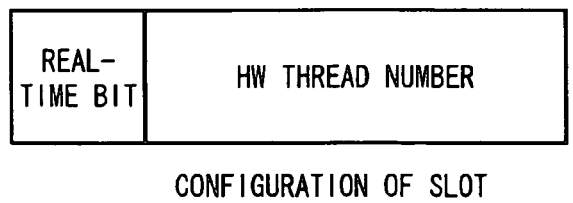
FIG. 3 is a schematic diagram illustrating a configuration of a slot in accordance with a first exemplary embodiment of the present invention.

The thread control register 33 includes a plurality of slots (e.g., slots SLT0 to SLT7). FIG. 3 shows a configuration of the slot. As shown in FIG. 3, each of the slots-SLT0 to SLT7 includes a number storage portion in which a hardware thread number is stored, and a real-time bit storage portion in which a period attribute setting flag that is used to determine the logic level of the real-time bit signal when that particular slot is selected is stored.

The counter 34 updates the count value CNT at predefined intervals. More specifically, the counter 34 in accordance with this exemplary embodiment of the present invention counts up the count value CNT in synchronization with the operation clock (not shown) of the multi-thread processor 1. The count maximum value storage unit 35 stores a count maximum value CNTM defining the upper limit value of the count value CNT of the counter 34. The match comparison circuit 36 compares the count value CNT with the count maximum value CNTM, and when the count value CNT matches with the count maximum value CNTM, outputs a reset signal RST that resets the count value of the counter 34. That is, the counter 34 repeats the counting-up action while initializing the count value CNT at predefined intervals, and thereby outputs the count value CNT whose value is cyclically updated.

The selector 37 selects one of the slots in the thread control register 33 according to the count value CNT, and outputs a real-time bit signal and a thread number A based on a value retained in the selected slot. More specifically, when the count value CNT is 0, the selector 37 selects the slot SLT0, and uses a hardware thread number retained in the number storage portion for the slot SLT0 as a thread number A and also uses the value of the period attribute setting flag retained in the real-time bit storage portion for the slot SLT0 as the logic level of the real-time bit signal.

Note that values retained in the slots in the thread control register 33 of the first thread scheduler 31, an initial value for the count value CNT of the counter 34, and a count maximum value CNTM of the count maximum value storage unit 35 are established by the management program that is executed when the multi-thread processor 1 is started up. Further, it is assumed that the management program reads these set values from the memory 2.

The second scheduler 32 selects an arbitrary hardware thread, for example, in accordance with the procedure of a round-robin method or a priority method. The hardware thread number output from this second scheduler 32 is referred to as "thread number B".

Figure 4:
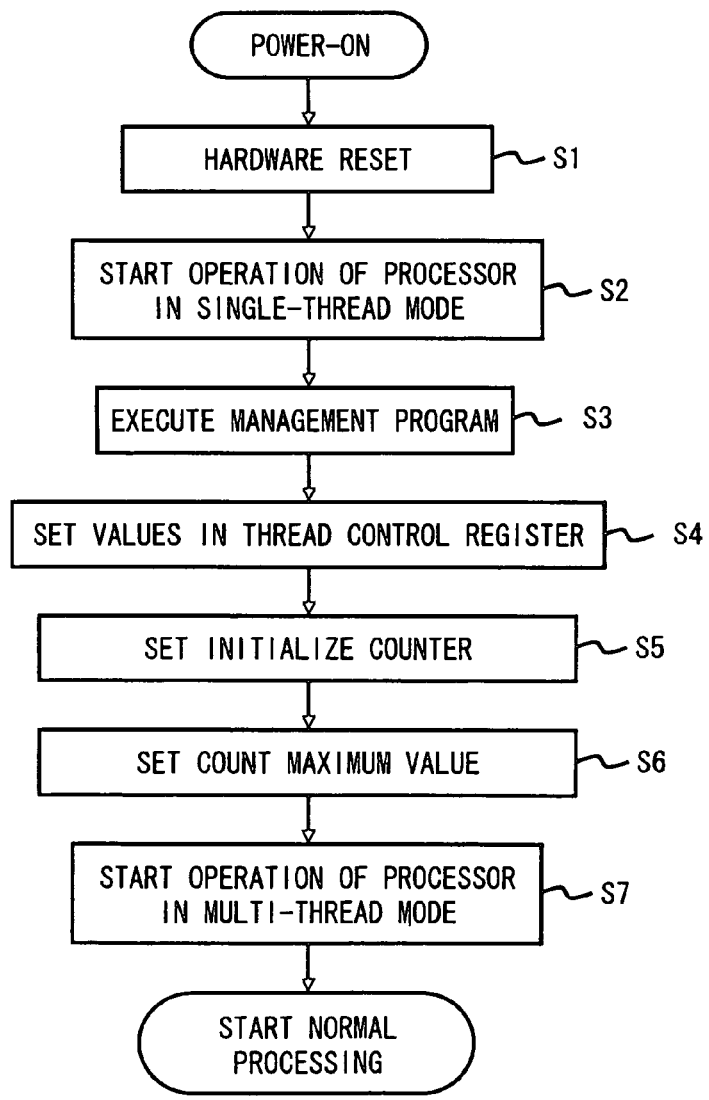
FIG. 4 is a flowchart showing operation procedure at the time when a multi-thread processor in accordance with a first exemplary embodiment of the present invention is started up.

Next, operations of the multi-thread processor 1 using the thread scheduler 19 are explained hereinafter. FIG. 4 shows a flowchart showing operation procedure from when the multi-thread processor 1 is powered on to when the normal processing is started. As shown in FIG. 4, after the power-on, the multi-thread processor 1 first initializes its circuit state by the hardware reset (step S1). Then, the multi-thread processor 1 starts operating in a single-thread (step S2). In this single-thread mode, the thread program counter TPC0, the instruction memory 14, and the instruction buffer area BUF0, for example, are activated, and other thread program counters TPC1 to TPC3 and instruction buffer areas BUF1 to BUF3 wait ready in the standby state.

Then, the multi-thread processor 1 read a management program from the memory 2 or other storage devices (not shown) and executes the management program (step S3). After that, the multi-thread processor 1 sets values in the slots in the thread control register 33 (step S4), initializes the count value of the counter 34 (step S5), and sets the count maximum value CNTM (step S6) in accordance with the management program. After the setting of these various registers is completed, the multi-thread processor 1 starts operating in a multi-thread mode (step S7). In this multi-thread mode, the thread program counter TPC0 to TCP3, the instruction memory 14, and the instruction buffer area BUF0 to BUF3, for example, are activated. Then, the multi-thread processor 1 starts the normal operation in the multi-thread mode.

Next, operations of the multi-thread processor 1 after the normal operation has started are explained hereinafter. In the following explanation, operations of the thread scheduler 19, in particular, are explained. Note that the following explanation is made on the assumption that the initial values for the count value CNT of the counter 34 and the count maximum value CNTM are 0 and 4 respectively as an example of the setting. With regard to values for the respective slots in the thread control register 33, it is also assumed that the real-time bits of the slots SLT0, SLT1, SLT2, SLT4, SLT5, and SLT7 are set to 1, and the real-time values of the slots SLT3 and SLT6 are set to 0. Furthermore, it is also assumed that the hardware thread numbers of the slots SLT0, SLT2, SLT5, and SLT7 are set to 0, the hardware thread numbers of the slots SLT1 and SLT4 are set to 1, and the hardware thread number of the slot SLT3 is set to 2.

FIG. 5 shows a table of hardware thread numbers that the thread selection signal TSEL output from the thread scheduler 19 selects under the above-described conditions. The table of FIG. 5 shows in what manner the thread selection signal TSEL is switched with the lapse of time. Note that timing at which the hardware threads selected by the thread scheduler 19 are switched is defined as one unit time.

As shown in FIG. 5, assuming that the count value CNT is, at first, 0 at a time t1, the selector 37 selects the slot SLT0. Therefore, the selector 37 sets the logic level of the real-time bit signal to 1 and sets the thread number A to 0th. Accordingly, the selector 30 outputs 0th, i.e., the thread number A as a thread selection signal TSEL.

Next, the count value CNT counted up to 1 at a time t2. Therefore, the selector 37 selects the slot SLT1. Therefore, the selector 37 sets the logic level of the real-time bit signal to 1 and sets the thread number A to 1st. Accordingly, the selector 30 outputs 1st, i.e., the thread number A as a thread selection signal TSEL.

Next, the count value CNT counted up to 2 at a time t3. Therefore, the selector 37 selects the slot SLT2. Therefore, the selector 37 sets the logic level of the real-time bit signal to 1 and sets the thread number A to 1st. Accordingly, the selector 30 outputs the assigned number of a hardware thread (e.g., nth) that is to be output as a thread number B as a thread selection signal TSEL Next, the count value CNT counted up to 3 at a time t4. Therefore, the selector 37 selects the slot SLT3. Therefore, the selector 37 sets the logic level of the real-time bit signal to 1 and sets the thread number A to 2nd. Accordingly, the selector 30 outputs 2nd, i.e., the thread number A as a thread selection signal TSEL.

Next, the count value CNT counted up to 4 at a time t5. Therefore, the selector 37 selects the slot SLT4. Therefore, the selector 37 sets the logic level of the real-time bit signal to 1 and sets the thread number A to 1st. Accordingly, the selector 30 outputs 1st, i.e., the thread number A as a thread selection signal TSEL.

Then, since the count value CNT reaches the count maximum value CNTM at the time t5, the count value CNT is reset after the lapse of the time t6. In this manner, the thread scheduler 19 repeats, in the period of the time t6 to t10, the actions performed in the time t1 to t5. In the multi-thread processor 1, the cycle with which the count value CNT is repeatedly reset is defined as "one cycle of a thread selection process".

Figure 6:
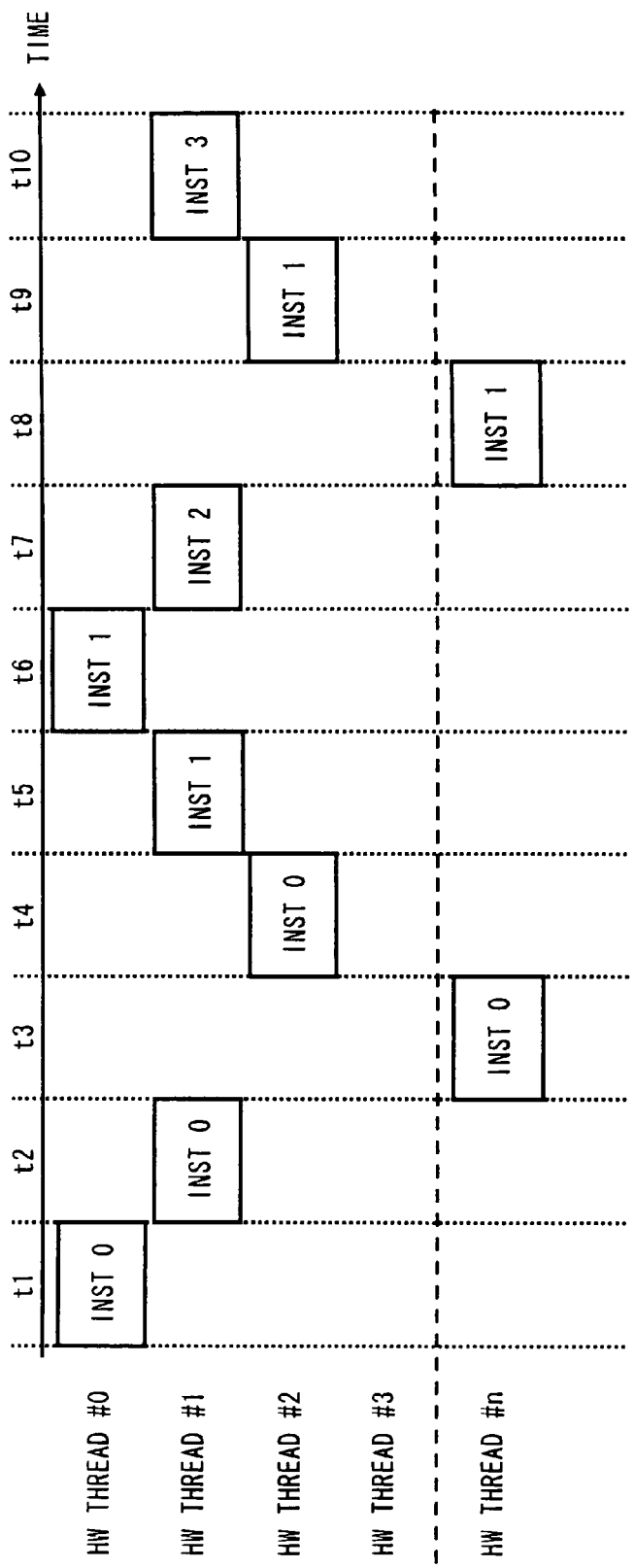
FIG. 6 is a timing chart showing operations of a multi-thread processor in accordance with a first exemplary embodiment of the present invention.

Next, FIG. 6 shows a timing chart of operations of the multi-thread processor 1 based on the thread selection signal TSEL output from the above-mentioned thread scheduler 19. Selected hardware threads and time shown in FIG. 6 are based on the thread selection signal TSEL and the time explained with FIG. 5.

As shown in FIG. 6, since the thread selection signal TSEL selects the 0th hardware thread at a time t1, the multi-thread processor 1 executes an instruction 0 belonging to the 0th hardware thread at that time. Next, the thread selection signal TSEL selects the 1st hardware thread at a time t2, and thus multi-thread processor 1 executes an instruction 0 belonging to the 1st hardware thread. Next, the thread selection signal TSEL selects an arbitrary hardware thread (e.g., nth hardware thread) selected by the second scheduler 32 at time t3, and thus the multi-thread processor 1 executes an instruction 0 belonging to the nth hardware thread. Next, the thread selection signal TSEL selects the 2nd hardware thread at a time t4, and thus multi-thread processor 1 executes an instruction 0 belonging to the 2nd hardware thread. Next, the thread selection signal TSEL selects the 1st hardware thread at a time t5, and thus multi-thread processor 1 executes an instruction 1 belonging to the 1st hardware thread. Then, the multi-thread processor 1 completes one cycle of the thread selection at the point when the time t5 has elapsed, and starts the next cycle of the thread selection process.

In the next cycle of the thread selection process (time t6 to t10), hardware threads are selected in a similar order to that in the cycle of the time t1 to t5. However, instructions to be processed in the selected hardware threads in this cycle are instructions subsequent to those in the preceding cycle.

For example, the thread selection signal TSEL selects the 0th hardware thread at a time t6, and thus multi-thread processor 1 executes an instruction 1 belonging to the 0th hardware thread. Next, the thread selection signal TSEL selects the 1st hardware thread at a time t7, and thus multi-thread processor 1 executes an instruction 2 belonging to the 1st hardware thread. Next, the thread selection signal TSEL selects an arbitrary hardware thread (e.g., nth hardware thread) selected by the second scheduler 32 at time t8, and thus the multi-thread processor 1 executes an instruction 1 belonging to the nth hardware thread. Next, the thread selection signal TSEL selects the 2nd hardware thread at a time t9, and thus multi-thread processor 1 executes an instruction 1 belonging to the 2nd hardware thread. Next, the thread selection signal TSEL selects the 1st hardware thread at a time t10, and thus multi-thread processor 1 executes an instruction 3 belonging to the 1st hardware thread.

When the thread scheduler 19 switches the hardware thread to be selected in a circular manner like this, the execution times of the hardware threads processed in one thread selection process cycle have predefined ratios. In the example shown in FIG. 6, the 0th hardware thread is executed once, the 1st hardware thread is executed twice, and the 2nd hardware thread is executed once in the first execution period. Further, the arbitrary hardware thread (nth hardware thread) is executed once in the second execution period. That is, the processor occupation time ratio of the first execution period to the second execution period is 80:20. Further, the 0th hardware thread secures at least 20% of the processor occupation time, the 1st hardware thread secures at least 40% of the processor occupation time, and the 2nd hardware thread secures at least 20% of the processor occupation time. Furthermore, in the second execution period to which 20% of the processor occupation time is allocated, the multi-thread processor 1 executes an arbitrary hardware thread depending on the processing situation in the multi-thread processor 1.

As explained above, in the multi-thread processor 1 in accordance with this exemplary embodiment of the present invention, the thread scheduler 19 selects predetermined hardware threads in a predetermined order in the first execution period during which the logic level of the real-time bit signal is 1, and selects arbitrary hardware threads in the second execution period during which the logic level of the real-time bit signal is 0. In this way, the multi-thread processor 1 ensures the minimum time of the processor occupation time for hardware threads selected in the first execution period. Further, by selecting arbitrary hardware threads in the second execution period, the multi-thread processor 1 can increase the processor occupation time for an arbitrary hardware thread depending on its processing situation Further, the multi-thread processor 1 in accordance with this exemplary embodiment of the present invention can arbitrarily determine the ratio of the first execution period to the second execution period and the ratios of hardware threads executed during the first execution period by the management program. That is, it becomes possible to choose a flexible way of selection of hardware threads by changing values for the slots in the thread control register 33 and a value of the count maximum value CNTM, which are set by the management program, according to processing requests for the multi-thread processor 1. More specifically, it is possible to select hardware threads to be executed in the first execution period by changing values of the real-time bits and the hardware thread numbers of the slots in the thread control register 33, and also possible to change the ratio of the first execution period to the second execution period. Further, it is also possible to change the length of one thread selection process cycle by changing the value to be set as the count maximum value CNTM.

Note that the present invention is not limited to the above-described exemplary embodiments, and they can be modified as appropriate without departing from the spirit of the present invention. For example, the thread scheduling method in the second scheduler can be changed as appropriate according to the specifications of the multi-thread processor.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A multi-thread processor comprising:
a plurality of hardware threads each of which generates an independent instruction flow;
a thread scheduler that outputs a thread selection signal in accordance with a schedule, the thread selection signal designating a hardware thread to be executed in a next execution cycle among the plurality of hardware threads;
a first selector that selects one of the plurality of hardware threads according to the thread selection signal and outputs an instruction generated by the selected hardware thread from instruction buffers;
the instruction buffers that store instruction fetched from an instruction memory, and output the fetched instruction to the first selector; and
an instruction fetch controller that controls which instruction buffer among the instruction buffers stores the fetched instruction,
wherein the thread scheduler specifies execution of at least one hardware thread pre-selected among the plurality of hardware threads in a predetermined first execution period, and specifies execution of a variably selected hardware thread in a second execution period other than the first execution period,
wherein a time ratio between the predetermined first execution period and the second execution period is set according to processing requests.

2. The multi-thread processor according to claim 1, wherein the thread scheduler executes the schedule in a circular manner.

3. The multi-thread processor according to claim 1, wherein the thread scheduler designates the variably selected hardware thread determined in accordance with a predefined algorism in the second execution period.

4. The multi-thread processor according to claim 1, wherein the thread scheduler comprises:
 a first scheduler that outputs a selection signal used to select the first execution period or the second execution period, and outputs a first hardware thread number specifying the hardware thread to be executed in a predetermined execution order in a period during which the selection signal specifies the first execution period;
 a second scheduler that outputs a second hardware thread number designating one of the plurality of hardware threads in accordance with a predefined algorism; and
 a second selector that selects one of the first hardware thread number and the second hardware thread number according to the selection signal, and outputs the selected hardware thread number as the thread selection, signal.

5. The multi-thread processor according to claim 4, wherein the thread scheduler comprises:
 a thread control register comprising a plurality of slots;
 a counter that updates a count value at predefined intervals; and
 a third selector that selects a slot from among the plurality of slots according to the count value, and outputs the selection signal and the first hardware thread number based on a value retained in the selected slot,
 wherein the hardware thread number and a period attribute setting flag are retained in each of the plurality of slots, the period attribute setting flag determining a logic level of the selection signal when a particular slot from among the plurality of slots is selected.

6. The multi-thread processor according to claim 5, wherein the count value of the counter is reset at predetermined intervals.

7. The multi-thread processor according to claim 1, wherein a value of the hardware thread designated by the thread scheduler in the predetermined first execution period is set by a management program that is executed after the multi-thread processor is started up.

8. The multi-thread processor according to claim 1, further comprising an execution pipeline that executes an instruction output from the first selector.

9. The multi-thread processor according to claim 8, wherein the thread scheduler is downstream from a fetch block comprising the instruction buffers and the fetch controller.

10. The multi-thread processor according to claim 1, wherein the thread scheduler is downstream from a fetch block comprising the instruction buffers.

11. The multi-thread processor according to claim 1, wherein the thread scheduler controls a schedule period according to the counter that is reset at pre-selected intervals.

12. The multi-thread processor according to claim 1, wherein the thread scheduler comprises:
 a thread control register comprising a plurality of slots;
 a counter that updates a count value at predefined intervals; and
 a second selector that selects one of the plurality of slots according to the count value, and outputs the selection signal and the first hardware thread number based on a value retained in the selected slot, and
 wherein the hardware thread number and a period attribute setting flag are retained in each of the slots, the period attribute setting flag determining a logic level of the selection signal when that particular slot is selected.

13. The multi-thread processor according to claim 1, wherein the instruction fetch controller that controls which instruction buffer among the instruction buffers stores the fetched instruction according to the number of instructions stored in the each instruction buffer to output a thread designation to the third selector.

14. The multi-thread processor according to claim 1, wherein the instruction fetch controller determines which hardware thread the fetched instruction belongs to according to a number of instructions stored in each of the instruction buffers, and outputs a thread selection signal to the third selector according to the determination by the instruction fetch controller.

15. The multi-thread processor according to claim 1, wherein the thread scheduler comprises:
 a thread control register comprising a plurality of slots;
 a counter that updates a count value at predefined intervals; and
 a second selector that selects one of the plurality of slots according to the count value, and outputs the selection signal and the first hardware thread number based on a value retained in the selected slot, and wherein the hardware thread number and a period attribute setting flag are retained in each of the slots, the period attribute setting flag determining a logic level of the selection signal when that particular slot is selected.

16. The multi-thread processor according to claim 1, further comprising a memory storing an executable program,
 wherein the program stored in the memory arbitrarily determines the time ratio between the predetermined first execution period and the second execution period and ratios of the plurality of hardware threads executed during the predetermined first execution period in accordance with the processing requests.

17. The multi-thread processor according to claim 1, further comprising a program stored in a non-transitory computer readable medium that determines the time ratio between the predetermined first execution period and the second execution period and ratios of the plurality of hardware threads executed during the predetermined first execution period.

18. The multi-thread processor according to claim 5, further comprising a program stored in a non-transitory computer readable medium that changes values for the plurality of slots in the thread control register and a maximum value of the count value for the counter according to processing requests.

19. The multi-thread processor according to claim 5, further comprising a program stored in a non-transitory computer readable medium to select hardware threads to be executed in the first execution period by changing values of real-time bits and hardware thread numbers of the slots in the thread control register.

20. The multi-thread processor according to claim 5, further comprising a program stored in a non-transitory computer readable medium that changes a length of a thread selection process cycle by changing a value to be set as a maximum count value for the counter.

21. The multi-thread processor according to claim 1, further comprising a management program stored in a non-transitory computer readable medium the changes the time ratio of the first execution period to the second execution period.

22. The multi-thread processor according to claim 1, wherein ratios of the plurality of hardware threads executed during the predetermined first execution period are changed according to processing requests.

23. The multi-thread processor according to claim 1, wherein the first selector that selects one of the plurality of hardware threads according to the thread selection signal and outputs an instruction generated by the selected hardware thread from instruction buffers independent of a number of instructions stored in the instruction buffers, and
wherein the instruction fetch controller that controls which instruction buffer among the instruction buffers stores the fetched instruction according to the number of instructions stored in each of the instruction buffers.

24. A hardware thread scheduling method in a multi-thread processor, the multi-thread processor comprising a plurality of hardware threads and being configured to execute an instruction flow generated by the hardware threads while switching the hardware threads in accordance with a predefined schedule, the hardware thread scheduling method comprising:
fetching instruction from an instruction memory for storage among a plurality of instruction buffers;
controlling, by an instruction fetch controller, which instruction buffer among the plurality of instruction buffers stores the fetched instruction;
outputting, by the instruction buffers, the fetched instructions to a first selector;
selecting, by the first selector, one hardware thread from among the plurality of hardware threads to be executed according to a thread execution schedule, the plurality of hardware threads each of which generates an independent instruction flow;
outputting an instruction output from the selected hardware thread for execution from the instruction buffers;
executing a thread execution schedule in a circular manner, the thread execution schedule including a first execution period during which the hardware thread, to be executed is determined in advance and a second execution period during which the hardware thread to be executed is variably determined; and
executing the instruction flow generated by the hardware thread designated in accordance with the thread execution schedule in succession,
wherein a time ratio between the first execution period and the second execution period is set according to processing requests.

25. The hardware thread scheduling method according to claim 24, further comprising controlling, by an instruction fetch controller, which instruction buffer among the plurality of instruction buffers stores the fetched instruction.

26. The hardware thread scheduling method according to claim 25, wherein the thread execution schedule is executed downstream from the fetching of the instruction and the controlling.

27. The hardware thread scheduling method according to claim 24, wherein the thread execution schedule is executed downstream from the fetching of the instruction.

28. The hardware thread scheduling method according to claim 24, wherein the executing of the thread execution schedule and the executing of the instruction flow is processed downstream from the fetching of the instruction.

29. A multi-thread processor comprising:
a plurality of hardware threads each of which generates an independent instruction flow;
a fetch block fetching instruction from an instruction memory for output to a first selector,
wherein the fetch block fetching comprises:
instruction buffers storing the fetched instructions; and
an instruction fetch controller controlling a selection of which instruction buffer among the instruction buffers stores the fetched instruction, the instruction buffers output the fetched instructions to the first selector;
a thread scheduler that outputs a thread selection signal in accordance with a schedule, the thread selection signal designating a hardware thread to be executed in a next execution cycle among the plurality of hardware threads;
the first selector that selects one of the plurality of hardware threads according to the thread selection signal and outputs an instruction generated by the selected hardware thread from the instruction buffers,
wherein the thread scheduler specifies execution of at least one hardware thread pre-selected among the plurality of hardware threads in a first execution period, and variably selected in a second execution period,
wherein the thread scheduler is downstream from the fetch block,
wherein the instruction fetch controller separately controls the selection of which instruction buffer from selection controlled by the thread scheduler, and
wherein a time ratio between the first execution period and the second execution period is set according to processing requests.

30. The multi-thread processor according to claim 29, wherein the instruction fetch controller controlling a fetch selection of which instruction buffer among the instruction buffers stores the fetched instruction, the instruction buffers output the fetched instructions to the first selector,
wherein the fetch selection controlled by the instruction fetch controller is independent of a control by the thread scheduler, and
wherein the thread scheduler is dedicated for controlling the first selector.

31. The multi-thread processor according to claim 29, further comprising:
an execution pipeline that executes an instruction output from the first selector,
wherein the thread scheduler specifies execution of at least one hardware thread pre-selected manner among the plurality of hardware threads in the first execution period, and specifies execution of a variable hardware thread in the second execution period other than the first execution period.

32. The multi-thread processor according to claim 29, wherein the instruction is fetched from an instruction memory of the fetch block, and the fetched instruction is stored in instruction buffers from the fetch block, and
wherein the fetch block further comprises an instruction fetch controller that controls which instruction buffer among the instruction buffers stores the fetched instruction, the instruction buffers output the fetched instructions to the first selector.

33. A multi-thread processor comprising:
a plurality of hardware threads each of which generates an independent instruction flow;
a thread scheduler that outputs a thread selection signal in accordance with a schedule, the thread selection signal designating a hardware thread to be executed in a next execution cycle among the plurality of hardware threads; and
a first selector that selects one of the plurality of hardware threads according to the thread selection signal and outputs an instruction generated by the selected hardware thread, wherein the thread scheduler specifies execution of at least one hardware thread pre-selected among the plurality of hardware threads in a predetermined first execution period, and specifies execution of a hardware thread arbitrarily selected in a second execution period other than the first execution period, wherein the thread scheduler comprises:
- a thread control register comprising a plurality of slots;
- a counter that updates a count value at predefined intervals; and
- a second selector that selects one of the plurality of slots according to the count value, and outputs the selection signal and the first hardware thread number based on a value retained in the selected slot, and wherein the hardware thread number and a period attribute setting flag are retained in each of the slots, the period attribute setting flag determining a logic level of the selection signal when that particular slot is selected, and wherein a time ratio between the predetermined first execution period and the second execution period is set according to processing requests.

34. The multi-thread processor according to claim 33, further comprising an execution pipeline that executes an instruction output from the first selector.

35. The multi-thread processor according to claim 33, wherein the count value of the counter is reset at predetermined intervals.

36. A multi-thread processor comprising:
- a thread scheduler that outputs a thread selection signal in accordance with a schedule, the thread selection signal designating a hardware thread to be executed in a next execution cycle among a plurality of hardware threads; and
- a first selector that selects one of the plurality of hardware threads according to the thread selection signal and outputs an instruction generated by the selected hardware thread, wherein the thread scheduler specifies execution of at least one hardware thread pre-selected among the plurality of hardware threads in a predetermined first execution period, and specifies execution of a hardware thread variably selected in a second execution period other than the first execution period, wherein the thread scheduler comprises:
- a thread control register comprising a plurality of slots;
- a counter that updates a count value at predefined intervals; and
- a second selector that selects one of the plurality of slots according to the count value, and outputs the selection signal and the first hardware thread number based on a value retained in the selected slot, wherein a time ratio between the predetermined first execution period and the second execution period is set according to processing requests.

37. The multi-thread processor according to claim 36, wherein the hardware thread number and a period attribute setting flag are retained in each of the slots, the period attribute setting flag determining a logic level of the selection signal when that particular slot is selected.

* * * * *